United States Patent
Glazer et al.

(10) Patent No.: US 11,992,014 B2
(45) Date of Patent: May 28, 2024

(54) ENTOMOPATHOGENIC NEMATODES (EPN) SPECIES AS A BIOLOGICAL DELIVERY SYSTEM

(71) Applicant: THE STATE OF ISRAEL, MINISTRY OF AGRICULTURE & RURAL DEVELOPMENT, AGRICULTURAL RESEARCH ORGANIZATION (ARO) (VOLCANI CENTER), Rishon Lezion (IL)

(72) Inventors: Itamar Glazer, Reut Maccabim (IL); Liora Salame, Rishon Lezion (IL); Dana Ment, Rishon Lezion (IL); Neta Morag, Kfar Menachem (IL)

(73) Assignee: THE STATE OF ISRAEL, MINISTRY OF AGRICULTURE & RURAL DEVELOPMENT, AGRICULTURAL RESEARCH ORGANIZATION (ARO) (VOLCANI CENTER), Rishon Lezion (IL)

( * ) Notice: Subject to any disclaimer, the term of this patent is extended or adjusted under 35 U.S.C. 154(b) by 862 days.

(21) Appl. No.: 17/045,767

(22) PCT Filed: Apr. 14, 2019

(86) PCT No.: PCT/IL2019/050422
§ 371 (c)(1),
(2) Date: Oct. 7, 2020

(87) PCT Pub. No.: WO2019/202588
PCT Pub. Date: Oct. 24, 2019

(65) Prior Publication Data
US 2021/0186027 A1  Jun. 24, 2021

Related U.S. Application Data

(60) Provisional application No. 62/657,917, filed on Apr. 15, 2018.

(51) Int. Cl.
*A01N 63/12* (2020.01)
*A01N 63/22* (2020.01)

(52) U.S. Cl.
CPC .............. *A01N 63/12* (2020.01); *A01N 63/22* (2020.01)

(58) Field of Classification Search
CPC ........ A01N 63/12; A01N 63/22; A01N 63/30; A01N 63/50; A01N 25/04
See application file for complete search history.

(56) References Cited

U.S. PATENT DOCUMENTS

2015/0011389 A1  1/2015  Hellwege
2017/0099844 A1  4/2017  Bruck

FOREIGN PATENT DOCUMENTS

| CN | 102703511 A | 10/2012 |
| CN | 105076213 A | 11/2015 |
| WO | WO-2013/110591 A1 | 8/2013 |
| WO | WO 2017/066094 A1 | 4/2017 |

OTHER PUBLICATIONS

Hatting, Justin L.; Moore, Sean D.; Malan, Antoinette P. Microbial control of phytophagous invertebrate pests in South Africa: Current status and future prospects. Journal of invertebrate pathology, 2019, 165: 54-66.
Helmberger, Maxwell S.; Shields, Elson J.; Wickings, Kyle G. Ecology of belowground biological control: Entomopathogenic nematode interactions with soil biota. Applied Soil Ecology, 2017, 121: 201-213.
Koul, Opender. Microbial biopesticides: opportunities and challenges. CAB Rev, 2011, 6: 1-26.
Ling, Yu "The regulation of intestinal bacterial adhesion and intestinal immunity II. The relationship between bacterial adhesion and immune stimulation" Poultry Farming and Avian Disease Control, 2005, No. 7, p. 14.
Monteiro, Caio Márcio Oliveira, et al. Association between entomopathogenic nematodes and fungi for control of *Rhipicephalus microplus* (Acari: Ixodidae). Parasitology research, 2013, 112.10: 3645-3651.
Otieno, Jacinter Atieno; Pallmann, Philip; Poehling, Hans-Michael. Additive and synergistic interactions amongst *Orius laevigatus* (Heteroptera: Anthocoridae), entomopathogens and azadirachtin for controlling western flower thrips (Thysanoptera: Thripidae). BioControl, 2017, 62.1: 85-95.
Qiu, H.; Wu, Z.-Q.; Liang, S.-Z. Metarhizium anisopliae and Its Mechanism for Killing Insects. Pesticides-Shenyang—, 2004, 43.8: 342-345.
Wu, Shaohui, et al. Interaction between entomopathogenic nematodes and entomopathogenic fungi applied to third instar southern masked chafer white grubs, *Cyclocephala lurida* (Coleoptera: Scarabaeidae), under laboratory and greenhouse conditions. Biological Control, 2014, 76: 65-73.
Azaizeh, H. et al. (2002). Biological control of the Western flower thrips*Frankliniella occidentalis* in cucumber using the entomopathogenic fungus*Metarhizium anisopliae*. Phytoparasitica, 30(1), 18-24.
Bischoff et al. (2009). A multilocus phylogeny of the Metarhizium anisopliae lineage. Mycologia, 101(4), 512-530.
Brandl, M. A. (2016). Exploitation of Synergistic Effects Between Semiochemicals and (Metarhizium Brunneum) Against Soil Pests (Doctoral dissertation, Niedersächsische Staats-und Universitätsbibliothek Göttingen).
Chitra, P et al. (2017). Entomopathogenic nematode as a biocontrol agent—Recent trends—A Review. International Journal of Advanced Research in Biological Sciences, 4(1), 9-20.

(Continued)

*Primary Examiner* — Ruth A Davis
(74) *Attorney, Agent, or Firm* — Mark S. Cohen; PEARL COHEN ZEDEK LATZER BARATZ LLP (57) ABSTRACT

Disclosed are beneficial complexes comprising entomopathogenic nematodes (EPNs), binders, and external cargos, methods for preparing the same and systems comprising the same.

19 Claims, 1 Drawing Sheet

(56) References Cited

OTHER PUBLICATIONS

De Nardo, E. A., et al. (2003). Compatibility of *Steinernema feltiae* (Nematoda: Steinernematidae) with pesticides and plant growth regulators used in glasshouse plant production. Biocontrol Science and Technology, 13(4), 441-448.

Gindin, G. et al. (2001). The susceptibility of *Boophilus annulatus* (Ixodidae) ticks to entomopathogenic fungi. Biocontrol Science and Technology, 11(1), 111-118.

Gindin, G. et al. (2002). The susceptibility of different species and stages of ticks to entomopathogenic fungi. Experimental & applied acarology, 28(1), 283-288.

Gindin, G. et al. (2014). Pathogenicity of *Metarhizium anisopliae* (Hypocreales: Clavicipitaceae) to tick eggs and the effect of egg cuticular lipids on conidia development. Journal of medical entomology, 46(3), 531-538.

Humbert, P. et al. (2017). Co-encapsulation of amyloglucosidase with starch and *Saccharomyces cerevisiae* as basis for a long-lasting $CO_2$ release. World Journal of Microbiology and Biotechnology, 33(4), 71.

International Search Report and Written Opinion issued for PCT Application No. PCT/IL2019/050422 dated Jun. 26, 2019.

Kaya et al. (1997). Techniques in insect nematology. In Manual of techniques in insect pathology (pp. 281-324). Academic Press.

Ment, D. et al. (2010). Metarhizium anisopliae conidial responses to lipids from tick cuticle and tick mammalian host surface. Journal of invertebrate pathology, 103(2), 132-139.

Ment, D. et al. (2010). Novel technique for quantifying adhesion of Metarhizium anisopliae conidia to the tick cuticle. Applied and environmental microbiology, 76(11), 3521-3528.

Ment, D. et al. (2010). The effect of temperature and relative humidity on the formation of Metarhizium anisopliae chlamydospores in tick eggs. Fungal biology, 114(1), 49-56.

Ment, D. et al. (2011). Thermal limitations of Metarhizium anisopliae efficacy: selection for application on warm-blooded vertebrates. BioControl, 56(1), 81-89.

Ment, D. et al. (2012). Resistant ticks inhibit Metarhizium infection prior to haemocoel invasion by reducing fungal viability on the cuticle surface. Environmental Microbiology, 14(6), 1570-1583.

Ment, D. et al. (2013). Role of cuticular lipids and water-soluble compounds in tick susceptibility to Metarhizium infection. Biocontrol Science and Technology, 23(8), 956-967.

Rasmann et al. (2005). Recruitment of entomopathogenic nematodes by insect-damaged maize roots. Nature, 434(7034), 732-737.

Rot, A. et al. (2013). On-host control of the brown dog tick *Rhipicephalus sanguineus* Latreille (Acari: Ixodidae) by *Metarhizium brunneum* (Hypocreales: Clavicipitaceae). Veterinary parasitology, 193(1-3), 229-237.

Samish, M. et al. (2001). Pathogenicity of entomopathogenic fungi to different developmental stages of *Rhipicephalus sanguineus* (Acari: Ixodidae). Journal of Parasitology, 87(6), 1355-1359.

Samish, M. et al. (2007). Controlling blood-sucking pests by entomopathogenic fungi. Entomological Research 37(Suppl.): A58-A59.

Samish, M. et al. (2014). Efficacy of the entomopathogenic fungus *Metarhizium brunneum* in controlling the tick *Rhipicephalus annulatus* under field conditions. Veterinary parasitology, 206(3-4), 258-266.

Shapiro-Ilan, D. I., et al. (2006). Entomopathogenic nematodes and bacteria applications for control of the pecan root-knot nematode, *Meloidogyne partityla*, in the greenhouse. Journal of nematology, 38(4), 449.

Spiegel, Y. et al. (1991). Wheat germ agglutinin bound to the outer cuticle of the seed gall nematodes *Anguina agrostis* and *A. tritici*. Journal of nematology, 23(4), 451.

Tomer, H. et al. (2018). Activity of native and commercial strains of *Metarhizium* spp. against the poultry red mite *Dermanyssus gallinae* under different environmental conditions. Veterinary parasitology, 262, 20-25.

Turlings et al. (2012). The importance of root-produced volatiles as foraging cues for entomopathogenic nematodes. Plant and Soil, 358(1), 51-60.

Van Tol, R. W. et al. (2001). Plants protect their roots by alerting the enemies of grubs. Ecology Letters, 4(4), 292-294.

Vemmer, M. et al. (2016). Development of a $CO_2$-releasing coformulation based on starch, *Saccharomyces cerevisiae* and *Beauveria bassiana* attractive towards western corn rootworm larvae. Pest management science, 72(11), 2136-2145.

Yaakov, N. et al. (2018). Single cell encapsulation via pickering emulsion for biopesticide applications. ACS omega, 3(10), 14294-14301.

ENTOMOPATHOGENIC NEMATODES (EPN) SPECIES AS A BIOLOGICAL DELIVERY SYSTEM

CROSS-REFERENCE TO RELATED APPLICATIONS

This application is a National Phase Application of PCT International Application No. PCT/IL2019/050422, International Filing Date Apr. 14, 2019, claiming the benefit of U.S. Patent Application No. 62/657,917, filed Apr. 15, 2018 which is hereby incorporated by reference.

FIELD

The disclosure is directed to the use of entomopathogenic nematodes (EPNs) as a biological delivery system for delivering desired cargos.

BACKGROUND

Entomopathogenic nematodes (EPNs), such as nematodes from the Rhabditida Steinemematidae and Heterorhabditidae families, including the *S. camocapsae* (Sc) *H. bacteriophora* (Hb) nematodes, are free-living, naturally occurring soil nematodes. As EPNs live parasitically inside an infected insect host, they are considered to be endo-parasitic. They infect many different types of insects, including larval forms of moths, butterflies, flies and beetles, as well as adult forms of beetles, grasshoppers and crickets.

For instance, EPNs are known to infect and reproduce within arthropod hosts, causing their death. They are available commercially and used, e.g., against various insects such as weevils, grubs, moths and flies' larvae. The infective stage of these nematodes (i.e. infective juvenile; IJ) is adapted for survival in the soil for long periods, including stress conditions. Having a wide range of hosts, the nematodes IJ can actively seek, locate and enter a target host, where it releases a bacterial symbiont that multiplies and kills the host. The adaption of nematodes IJ to survival and host finding, makes EPNs an optimal bio-control agent.

Further, it is known in the field that soil inhabiting and tunneling/borer insects are particularly challenging pests, since conventional strategies to deliver pesticides to these pests are usually ineffective. Without being bound to any theory or mechanism, EPNs are superior to other approaches of pest management, having a natural ability to actively seek the pests.

The Red Palm Weevil (RPW) *Rhynchophorus ferrugineus*, which is one of the most significant pests, causes enormous damages to palm trees in Asia, Africa and the Mediterranean region. Pest control is problematic and not always effective, requiring repeated and intensive treatments, as the immature *Rhynchophorus ferrugineus* stages develop and tunnel within the tree trunk, eventually causing the collapse and death of the tree. Thus, there is an urgent need to develop and utilize bio-control agents to protect RPW. Several studies have demonstrated the potential use of EPNs or EPFs as effective bio-control agents against RPW. However, none of those studies provided sufficiently effective results.

Soil-inhabited entomopathogenic fungi (EPF), such as the *Metarhizium* species complex, are commonly used as bio-control agents since they attack a wide range of arthropods, including species of agricultural, medical and veterinary importance. One of the key factors in the success of bio-control by EPF is the initial contact and attachment of the EPF spore to the cuticle of the target host, e.g. arthropods. However, current bio-control methods, which include mechanically incorporating the immobile EPF spores into the soil, do not always enable effective contact between the EPF and the arthropods.

Many EPN-based biological plant protection products are commercially available from several vendors (E-NEMA, KOPPERT, BASF, BETTERPLANTS) e.g. for protecting against the sciarid fly, western flower thrips, vine weevil and other weevils, white grubs, codling moth, cut worms, leather jacket, red palm weevil and cranberry girdler, while spore-based biological plant protection products are available by other vendors (BIOWORKS, ANDERMATT BIOCONTROL, NOVOZYMES, REALIPM, BASF).

Generally, there is a need to provide more efficient and non-toxic methods for controlling various types of pests.

SUMMARY

Provided herein are multi-component, biological delivery systems, comprising live entomopathogenic nematodes (EPNs) manipulated to physically carry external cargos. As EPNs do not naturally carry external cargos on their external surfaces, special binders or glues are further provides to attach such cargos to the EPNs. Harnessing the natural biological attributes of EPNs, such as their innate capability to infect insects, to deliver e.g. biologically active and chemically-active agents, provides a useful technology in the field of pest control.

More specifically, provided herein are chemical binder compositions that are capable to simultaneously bind both EPNs and cargo compositions, thus forming useful EPN-binder-cargo complexes.

The present disclosure provides, in one aspect, a complex comprising an entomopathogenic nematode (EPN), a cargo composition attached to the external surface of the EPN, and a binder composition that binds the external cargo composition to the external surface of the EPN.

In certain embodiments, the EPN is selected from the group consisting of Steinemema *carpocapsae* (Sc), Heterorhabditis *bacteriophora* (Hb), Heterorhabditis *indica*, Steinemema *feltiae*, Steinemema *kraussei*, and Steinemema *glaseri*. In certain embodiments, the EPN comprises *S. carpocapsae* (Sc). In certain embodiments, the EPN comprises *H. bacteriophora* (Hb).

In certain embodiments, the EPN is in third-stage, infective juvenile (U) phase.

In certain embodiments, the cargo composition increases the pathogenicity of the EPN towards a pest.

In certain embodiments, the pest is selected from the group consisting of a Lepidoptera, a Coleoptera, a Hemiptera, a Diptera, an Orthoptera, an Acari, and a Gastropoda.

In certain embodiments, the cargo composition comprises an agent selected from the group consisting of a spore of a fungus, a soil-inhabited entomopathogenic fungus (EPF), bacteria pathogenic to insect, a pesticide emitting composition, and any combination thereof.

In certain embodiments, the bacteria are gram-positive bacteria. In certain embodiments, the bacteria are in the order Bacillales. In certain embodiments, the bacteria are in the Genera *Bacillus*. In certain embodiments, the bacteria are in the Genera *Paenibacillus*. In certain embodiments, the bacteria are in the Genera *Lysinibacillus*.

In certain embodiments, the spore of the fungus is selected from the group consisting of a spore of *Metarhizium anisopliae, Metarhizium brunneum, Metarhizium robertsii, Metarhizium frigidum, Metarhizium riley, Metarhizium acri-*

*dum, Beauveria brongniartii, Beauveria bassiana, Veticillium lecanii,* and *Isaria fumosoroseous*. In certain embodiments, the spore of the fungus is a spore of Mb. In certain embodiments, the spore of the fungus is a spore of Mb strain 7 (Mb7).

In certain embodiments, the cargo composition promotes plant viability or growth.

In certain embodiments, the plant is selected from the group consisting of corn, wheat, oilseed rape, melon, tomato, alfalfa, sorghum, onion, citrus, bean, sugarcane, and coffee.

In certain embodiments, the cargo composition comprises an agent selected from the group consisting of a CO2 emitting composition, a nutrient emitting composition, a pesticide emitting composition, symbiont bacteria, symbiont fungi, and any combination thereof.

In certain embodiments, the binder composition comprises a lectin. In certain embodiments, the binder composition comprises an agglutinin protein. In certain embodiments, the binder composition binds to N-acetyl-D-glucosamine (GlcNAc) or to a sialic acid. In certain embodiments, the binder composition binds to N-acetyl-D-glucosamine (GlcNAc) and to a sialic acid. In certain embodiments, the binder composition binds to N-acetyl-D-glucosamine in the form of chitin. In certain embodiments, the e binder composition comprises wheat germ agglutinin (WGA). In certain embodiments, the WGA comprises a WGA homodimer.

In certain embodiments, the complex comprises an *S. carpocapsae* (Sc) or a *H. bacteriophora* (Hb) entomopathogenic nematode (EPN), a cargo composition comprising a spore of Mb strain 7 (Mb7), and a binder composition comprising wheat germ agglutinin (WGA) that binds the cargo composition to the EPN. In certain embodiments, the complex comprises an Sc EPN, a spore of Mb7 and WGA. In certain embodiments, the complex comprises an Hb EPN, a spore of Mb7 and WGA.

The present disclosure further provides, in another aspect, a method for preparing a complex, wherein the complex comprises an entomopathogenic nematode (EPN), a cargo composition attached to the external surface of the EPN, and a binder composition that binds the external cargo composition to the external surface of the EPN, the method comprising the steps of incubating the EPN with the binder composition to prepare an EPN-binder complex, incubating the cargo composition with the binder composition to prepare a cargo-binder complex, and optionally incubating the EPN-binder complex with the cargo-binder complex, thereby preparing the EPN-binder-cargo complex.

In certain embodiments, the method comprises the step of incubating the EPN with the binder composition and with the cargo composition, thereby preparing the EPN-binder-cargo complex.

In certain embodiments, the method comprises the steps of incubating the EPN with the binder composition to prepare an EPN-binder complex, and incubating the cargo composition with the EPN-binder complex, thereby preparing the EPN-binder-cargo complex.

In certain embodiments, the method comprises the steps of incubating the cargo composition with the binder composition to prepare a cargo-binder complex, and incubating the EPN with the cargo-binder complex, thereby preparing the EPN-binder-cargo complex.

In certain embodiments, the method comprises the steps of incubating the EPN with the binder composition to prepare an EPN-binder complex, incubating the cargo composition with the binder composition to prepare a cargo-binder complex, and incubating the EPN-binder complex with the cargo-binder complex, thereby preparing the EPN-binder-cargo complex.

In certain embodiments, each step of incubation is independently performed at about 25° C.

In certain embodiments, each step of incubation is independently performed for at least about 5 minutes. In certain embodiments, each step of incubation is independently performed for about 45 minutes to about 12 hours.

In certain embodiments, each step of incubation is independently performed in the dark.

In certain embodiments, the EPN is in a concentration of about $10^3$/ml. In certain embodiments, the binder is WGA in a concentration of about $10^2$ µg/ml. In certain embodiments, the cargo is Mb7 spore in a concentration of about $10^6$/ml.

The present disclosure further provides, in another aspect, a complex comprising an entomopathogenic nematode (EPN), a cargo composition attached to the external surface of the EPN, and a binder composition that binds the external cargo composition to the external surface of the EPN, obtainable by the methods described above.

The present disclosure further provides, in another aspect, a composition, comprising a complex comprising an entomopathogenic nematode (EPN), a cargo composition attached to the external surface of the EPN, and a binder composition that binds the external cargo composition to the external surface of the EPN.

The present disclosure further provides, in another aspect, a pesticide composition, comprising a complex comprising an entomopathogenic nematode (EPN), a cargo composition attached to the external surface of the EPN, and a binder composition that binds the external cargo composition to the external surface of the EPN, and at least one additional pesticide.

The present disclosure further provides, in another aspect, a plant-supporting composition, comprising a complex comprising an entomopathogenic nematode (EPN), a cargo composition attached to the external surface of the EPN, and a binder composition that binds the external cargo composition to the external surface of the EPN, and at least one additional plant nutrient.

In certain embodiments of the compositions described above, the composition is in the form of a suspension.

The present disclosure further provides, in another aspect, a method of killing or sustainably inhibiting a pest, comprising the step of contacting the pest with a complex comprising an entomopathogenic nematode (EPN), a cargo composition attached to the external surface of the EPN, and a binder composition that binds the external cargo composition to the external surface of the EPN, wherein the cargo composition increases the pathogenicity of the EPN towards the pest.

The present disclosure further provides, in another aspect, a method of preventing or treating a pest infection of a plant, comprising the step of administering a complex comprising an entomopathogenic nematode (EPN), a cargo composition attached to the external surface of the EPN, and a binder composition that binds the external cargo composition to the external surface of the EPN to the plant, wherein the cargo composition increases the pathogenicity of the EPN towards the pest.

The present disclosure further provides, in another aspect, a method of promoting plant viability or growth, comprising the step of contacting the plant with a complex comprising an entomopathogenic nematode (EPN), a cargo composition attached to the external surface of the EPN, and a binder composition that binds the external cargo composition to the external surface of the EPN, wherein the cargo composition promotes plant viability or growth.

BRIEF DESCRIPTION OF THE DRAWINGS

The subject matter regarded as the disclosure is particularly pointed out and distinctly claimed in the concluding portion of the specification. The disclosure, however, both as to organization and method of operation, together with objects, features and advantages thereof, may best be understood by reference to the following detailed description when read with the accompanied drawings. Embodiments of the disclosure are illustrated by way of example and not limitation in the figures of the accompanying drawings, in which like reference numerals indicate corresponding, analogous or similar elements, and in which:

FIGS. 1A, 1B and 1C present the binding of wheat germ agglutinin (WGA, a lectin that protects wheat from insects, yeast and bacteria, red) to: (1A) *Metrhizium brunneum* (Mb7) spores (green), (1B) *S. carpocapsae* (Sc), and (3C) *H. bacteriophora* (Hb).

FIGS. 2A and 2B present binding Mb7 spores (green) to Hb and Sc EPNs, respectively.

FIGS. 3A, 3B and 3C present: (3A) germination of Mb7 spores on the larvae when the Mb7 suspension was dripped directly on the larvae (positive control); (3B) no germination of Mb7 spores when Sc EPNs were incubated with Mb7 without WGA (negative control); and (3C) germination of Mb7 spores on the larvae cuticle when WGA was used.

DETAILED DESCRIPTION OF EMBODIMENTS OF THE DISCLOSURE

The disclosure provided herein described a technology, compositions of matter and methods, beneficial in the field of plant and crop management. Specifically, the compositions and methods provided herein relate to combinations and complexes of entomopathogenic nematodes (EPNs), plant-benefiting cargos, and means to contact the two.

Such combinations and complexes can be utilized in a variety of applications. In turn, a specific application may necessitate a specific combination EPNs and cargos. Provided below are certain exemplary aspects and embodiments of the provided technology. Although described separately for convenience, a person of skill in the art would appreciate that each embodiment of each component of the complexes provided herein can be combined, linked and/or reduced to practice with each embodiment of each other component of the complexes provided herein.

Entomopathogenic Nematodes (EPNs)

Entomopathogenic nematodes are long known to be naturally attracted to plant roots (Turlings et al., Plant Soil, 2012, Vol. 358, pages 51-60), and to be potent pesticides (E-NEMA, KOPPERT, BETTERPLANTS, BASF) of plant pests.

This combination of traits makes them promising candidates to act as natural, biological, plant-root-targeted carriers for different classes of cargos which are not naturally found in the vicinity of plant roots.

According to the principles of the present disclosure, all EPNs can be included in the complexes provided herein and be useful in the methods provided herein In certain embodiments, the EPN is of the Order Rhabditida. In certain embodiments, the EPN is of the Family Steinernematidae. In certain embodiments, the EPN is of the Genus Steinernema. In certain embodiments, the EPN is of the Family Heterorhabditidae. In certain embodiments, the EPN is of the Genus Heterorhabditis.

Cargo and Cargo Compositions

According to the principles of the present disclosure, substantially any type of cargo can be attached to, and carried by, the EPNs. As one with skill in the art will recognize, when determining the desired effect of the complexes provided herein, suitable cargos become more relevant than others.

One exemplary desired activity of the complexes provided herein is killing or sustainably inhibiting organisms that feed of plant roots or infest plants e.g. via their roots. In such a scenario, the natural pesticide activity of EPNs may be augmented, at least additively if not synergistically, by cargos with an identical, similar, overlapping, different or complementary pesticide activity.

In some embodiments, the EPN and the cargo have an identical, similar, overlapping, different or complementary pesticide activity. In some embodiments, the EPN and the cargo have an identical pesticide activity. In some embodiments, the EPN and the cargo have a similar pesticide activity. In some embodiments, the EPN and the cargo have an overlapping pesticide activity. In some embodiments, the EPN and the cargo have a different pesticide activity. In some embodiments, the EPN and the cargo have a complementary pesticide activity. As one with skill in the art would appreciate, the term "pesticide activity" as used herein generally refers to the range of pests susceptible to the EPN and/or cargo.

Another exemplary desired activity of the complexes provided herein is supporting plant viability or growth e.g. via their roots. In such a scenario, cargos are selected to provide or increase the level of at least one plant-beneficial composition in the soil in proximity to the plant.

In some embodiments, the cargo comprises a nutrient. In some embodiments, the nutrient is selected from the group consisting of nitrogen (N), phosphorus (P), potassium (K), calcium (Ca), sulfur (S), magnesium (Mg), carbon (C), oxygen (O), hydrogen (H), iron (Fe), boron (B), chlorine (Cl), manganese (Mn), zinc (Zn), copper (Cu), molybdenum (Mo), nickel (Ni) salts thereof, and ions thereof.

Also, according to the principles of the present disclosure, cargo compositions may consist of the cargo itself, or comprise additional components. Such additional components may be needed for several reasons. One exemplary component of cargo composition may be a formulation agent needed to stabilize the cargo structurally. Another exemplary component of cargo composition may be a protective agent needed for the cargo to remain potent over time. Another exemplary component of cargo composition may be a release agent needed to control or modulate the release of the cargo from the cargo composition. Another exemplary component of cargo composition may be a coating agent needed to enable the binding of the cargo to the EPN.

Binder and Binder Compositions

According to the principles of the present disclosure, and as tested and exemplified herein, the binding or attachment of external cargos to EPNs is not straightforward. Antibodies (against GlcNAc), peptides (poly-lysine), cross linkers (Sulfhydryl-Sulfhydryl, amine-amine, Sulfhydryl-amine, NHS-PEG-Maleimide), polysaccharides (Chitosan), and proteonids (Poly-lysine-DOPA-Phenylalanine) have all failed in establishing such an attachment.

However, lectins have been found to readily contact EPNs to cargos, with no need for elaborate catalysators or cumbersome methods.

In some embodiments, the binder is a lectin. In some embodiments, the binder is a carbohydrate-binding protein. In some embodiments, the binder is a macromolecule highly specific for sugar moieties. In some embodiments, the binder is a phytohemagglutinin (PHA). In some embodiments, the binder is PHA-L. In some embodiments, the binder is PHA-E. In some embodiments, the binder has carbohydrate-binding specificity for a complex oligosaccharide containing galactose, N-acetylglucosamine, and mannose.

Figure 1A:
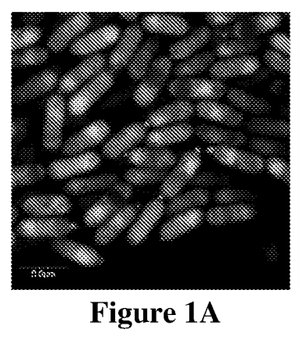
Figure 1B:
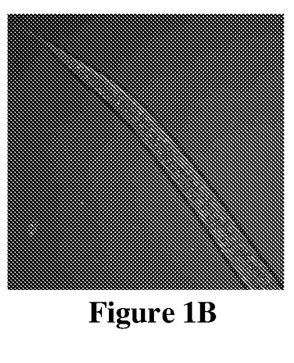
Figure 1C:
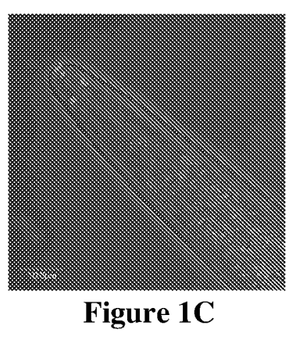
Figure 2A:
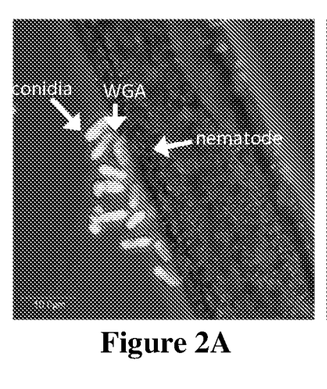
Figure 2B:
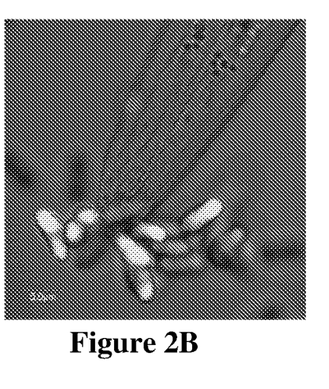
Figure 3A:
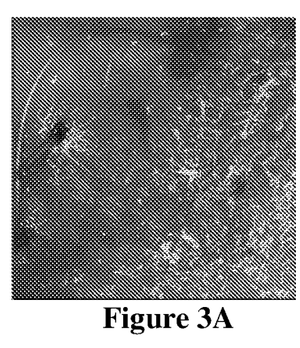
Figure 3B:
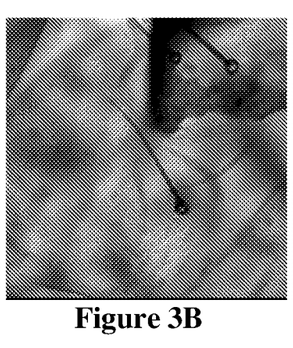
Figure 3C:
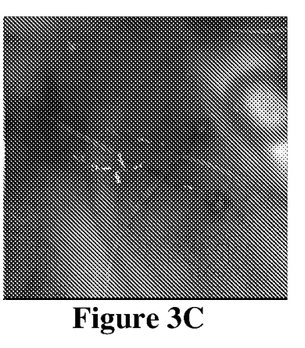

In some embodiments, the binder is chemically different from the cargo. In some embodiments, the binder is chemically different from the cargo composition. In some embodiments, the cargo composition does not comprise the binder. In some embodiments, the cargo composition does not comprise the binder composition. In some embodiments, the binder is chemically different from the EPN. In some embodiments, the EPN does not comprise the binder. In some embodiments, the EPN does not comprise the binder composition.

Also, according to the principles of the present disclosure, binder compositions may consist of the binder itself, or comprise additional components. Such additional components may be needed for several reasons. One exemplary component of binder composition may be a formulation agent needed to stabilize the binder structurally. Another exemplary component of binder composition may be a protective agent needed for the binder to remain potent over time. Another exemplary component of binder composition may be a release agent needed to control or modulate the release of the cargo from the EPN.

Methods for Producing Complexes

According to the principles of the present disclosure, and as tested and exemplified herein, to prepare the complexes provided herein, a single type of binder is both necessary and sufficient. Beneficially, the methods provided herein for preparing the complexes provided herein may be performed in one, two or three simple steps. Further beneficially, the methods provided herein for preparing the complexes provided herein may be performed in a single vessel (a so-called "one-pot" method), or in two or three vessels. Yet further beneficially, the methods provided herein for preparing the complexes provided herein may be performed in room temperature, with no need for laboratory equipment or conditions. Therefore, such methods may be performed in the field, i.e. preparing the complexes provided herein by the methods provided herein near their time of use.

A person of skill in the art would appreciate that certain conditions of the methods provided herein for preparing the complexes provided herein, such as the disclosed temperatures, periods, and/or concentrations of each one of the ingredients (EPNs, cargos, binders) may be adjusted to increase the yield of such methods.

Methods of Using Complexes

According to the principles of the present disclosure, and as tested and exemplified herein, the complexes provided herein may be utilized for numerous applications, especially in the fields of pest control and plant support.

Without being bound by any theory or mechanism, the complexes provided herein may act as "double-punch" agents, wherein the EPNs and the cargos each have its own activity and effect.

For example, in pest control applications, the EPNs may contribute targeting of the complexes provided herein to the pests and/or to areas in the soil infested with pests, such as plant roots, and an innate pesticide activity, while the cargo may contribute a complementary pesticide activity, thus together the EPNs and the cargo kill or sustainably inhibit a wider array of pests than the EPNs or the cargo would kill or inhibit alone.

In another example, in plant support applications, the EPNs may contribute targeting of the complexes provided herein to the plant roots, while the cargo may contribute a plant nutrient, thus together the EPNs and the cargo form a targeted plant nutrient complex.

In yet another example, in overlapping applications, the EPNs may contribute targeting of the complexes provided herein to the pests and/or to areas in the soil infested with pests, such as plant roots, and an innate pesticide activity, while the cargo may contribute a complementary pesticide activity and also plant nutrients, thus together the EPNs and the cargo kill or sustainably inhibit a wider array of pests than the EPNs or the cargo would kill or inhibit alone, and the plant receives plant nutrients.

The present disclosure provides, in one aspect, a complex comprising an entomopathogenic nematode (EPN), a cargo composition attached to the external surface of the EPN, and a binder composition that binds the external cargo composition to the external surface of the EPN.

In certain embodiments, the EPN is of the Order Rhabditida. In certain embodiments, the EPN is of the Family Steinemematidae. In certain embodiments, the EPN is of the Family Heterorhabditidae. In certain embodiments, the EPN is of the Genus Steinemema. In Certain Embodiments, the EPN is of the Genus Heterorhabditis. In Certain embodiments, the EPN is of the Genus Phasmarhabditis.

In certain embodiments, the EPN is selected from the group consisting of Steinemema *carpocapsae* (Sc), Heterorhabditis *bacteriophora* (Hb), Heterorhabditis *indica* (Hi), Steinemema *feltiae* (Sf), Steinemema *kraussei* (Sk), Steinemema *glaseri* (Sg), Phasmarhabditis *hermaphrodita* (Ph), Phasmarhabditis *neopapillosa* (Pn) and Phasmarhabditis *caltfomica* (Pc). In certain embodiments, the EPN comprises the Species *S. carpocapsae* (Sc). In certain embodiments, the EPN comprises the Species *H. bacteriophora* (Hb). In certain embodiments, the EPN comprises the Species Heterorhabditis *indica* (Hi). In certain embodiments, the EPN comprises the Species Steinemema *feltiae* (Sf). In certain embodiments, the EPN comprises the Species Steinemema *kraussei* (Sk). In certain embodiments, the EPN comprises the Species Steinemema *glaseri* (Sg). In certain embodiments, the EPN comprises the Species Phasmarhabditis *hermaphrodita* (Ph). In certain embodiments, the EPN comprises the Species Phasmarhabditis *neopapillosa* (Pn). In certain embodiments, the EPN comprises the Species Phasmarhabditis *californica* (Pc). In certain embodiments, the EPN comprises the Species Heterorhabditis *zealandica* (Hz). In certain embodiments, the EPN comprises the Species Heterorhabditis *megidis* (Hm).

In certain embodiments, the EPN is in third-stage, infective juvenile (IJ) phase. In certain embodiments, the EPN is in third-stage phase. In certain embodiments, the EPN is in infective juvenile (IJ) phase.

In certain embodiments, the cargo composition increases the pathogenicity of the EPN towards a pest. In certain embodiments, the cargo composition increases the pathogenicity of the EPN towards a pest compared to the pathogenicity of the EPN alone towards the pest.

In certain embodiments, the pest is selected from the group consisting of a Lepidoptera, a Coleoptera, a Hemiptera, a Diptera, an Orthoptera, an Acari, and a Gastropoda.

In certain embodiments, the pest is of the Order Lepidoptera. In certain embodiments, the pest is of the Suborder Aglossata. In certain embodiments, the pest is of the Suborder Glossata. In certain embodiments, the pest is of the Suborder Heterobathmiina. In certain embodiments, the pest is of the Suborder Zeugloptera.

In certain embodiments, the pest is of the Order Coleoptera. In certain embodiments the pest is of the Suborder Adephaga. In certain embodiments the pest is of the Suborder Archostemata. In certain embodiments the pest is of the Suborder Myxophaga. In certain embodiments the pest is of the Suborder Polyphaga. In certain embodiments the pest is of the Suborder Protocoleoptera.

In certain embodiments, the pest is of the Order Hemiptera. In certain embodiments the pest is of the Suborder Auchenorrhyncha. In certain embodiments the pest is of the Suborder Coleorrhyncha. In certain embodiments the pest is of the Suborder Heteroptera. In certain embodiments the pest is of the Suborder Stemorrhyncha.

In certain embodiments, the pest is of the Order Diptera.

In certain embodiments, the pest is of the Order Orthoptera. In certain embodiments the pest is of the Suborder Ensifera. In certain embodiments the pest is of the Suborder Caelifera.

In certain embodiments, the pest is of the Subclass Acari. In certain embodiments, the pest is of the Suborder Acariformes. In certain embodiments, the pest is of the Suborder Parasitiformes.

In certain embodiments, the pest is of the Class Gastropoda. In certain embodiments, the pest is of the Family Arionidae. In certain embodiments, the pest is of the Family Milacidae. In certain embodiments, the pest is of the Family Agriolimacidae. In certain embodiments, the pest is of the Family Limacidae. In certain embodiments, the pest is of the Family Vaginulidae.

In certain embodiments, the cargo composition comprises an agent selected from the group consisting of a spore of a fungus, a soil-inhabited entomopathogenic fungus (EPF), bacteria pathogenic to insect, a pesticide emitting composition, and any combination thereof.

In certain embodiments, the cargo composition comprises a cargo which is chemically similar to a spore of a fungus. In certain embodiments, the cargo composition comprises a spore of a fungus. In certain embodiments, the spore of the fungus is chemically similar to a spore of Order Hypocreales. In certain embodiments, the spore of the fungus is chemically similar to a spore of Family Clavicipitaceae. In certain embodiments, the spore of the fungus is chemically similar to a spore of Genus *Metarhizium*. In certain embodiments, the spore of the fungus is chemically similar to a spore of Species *Metarhizium brunneum* (Mb). In certain embodiments, the spore of the fungus is chemically similar to a spore of Mb strain 7 (Mb7). As a person of the art would appreciate, the term "chemically similar" as used herein refers to the chemical structure of the external surface of a spore of a fungus.

In certain embodiments, the cargo composition comprises a cargo which is at least partly coated by an agent which is chemically similar to a spore of a fungus. In certain embodiments, the cargo composition comprises cargo within a spore of a fungus. In certain embodiments, the coating agent is chemically similar to a spore of Order Hypocreales. In certain embodiments, the coating agent is chemically similar to a spore of Family Clavicipitaceae. In certain embodiments, the coating agent is chemically similar to a spore of Genus *Metarhizium*. In certain embodiments, the coating agent is chemically similar to a spore of Species *Metarhizium brunneum* (Mb). In certain embodiments, the coating agent is chemically similar to a spore of Mb strain 7 (Mb7). As a person of the art would appreciate, the term "coating agent" as used herein refers to the chemical structure between the external surface of the EPN and the cargo in the cargo composition.

In certain embodiments, the cargo composition comprises bacteria pathogenic to insect. In certain embodiments, the bacteria are gram-positive bacteria. In certain embodiments, the bacteria are in the order Bacillales. In certain embodiments, the bacteria are in the Genera *Bacillus*. In certain embodiments, the bacteria are in the Genera *Paenibacillus*. In certain embodiments, the bacteria are in the Genera *Lysinibacillus*.

In certain embodiments, the cargo composition comprises a pesticide emitting composition. In certain embodiments, the pesticide is selected from the group consisting of essential oils, cypermethrin, azadirachtin, lambda cyalothrin, pyrethroids, spinosad, emamectin benzoate, Bifenthrin, and Neem oil.

In certain embodiments, the spore of the fungus is of a fungus of the Order Hypocreales. In certain embodiments, the spore of the fungus is of a fungus of the Family Clavicipitaceae. In certain embodiments, the spore of the fungus is of a fungus of the Family Cordycipitaceae. In certain embodiments, the spore of the fungus is of a fungus of the Genus *Metarhizium*. In certain embodiments, the spore of the fungus is of a fungus of the Genus *Beauveria*. In certain embodiments, the spore of the fungus is of a fungus of the Genus *Veticillium*. In certain embodiments, the spore of the fungus is of a fungus of the Genus *Isaria*. In certain embodiments, the spore of the fungus is of a fungus of the Species *M. anisopliae*. In certain embodiments, the spore of the fungus is of a fungus of the Species *M. brunneum*. In certain embodiments, the spore of the fungus is of a fungus of the Species *M. robertsii*. In certain embodiments, the spore of the fungus is of a fungus of the Species *M. frigidum*. In certain embodiments, the spore of the fungus is of a fungus of the Species *M. riley*. In certain embodiments, the spore of the fungus is of a fungus of the Species *M. acridum*. In certain embodiments, the spore of the fungus is of a fungus of the Species *B. brogniartii*. In certain embodiments, the spore of the fungus is of a fungus of the Species *B. bassiana*. In certain embodiments, the spore of the fungus is of a fungus of the Species *V. lecanii*. In certain embodiments, the spore of the fungus is of a fungus of the Species *I. filmosoroseous*.

In certain embodiments, the spore of the fungus is selected from the group consisting of a spore of *Metarhizium anisopliae, Metarhizium brunneum* (Mb), *Metarhizium robertsii, Metarhizium frigidum, Metarhizium riley, Metarhizium acridum, Beauveria brongniartii, Beauveria bassiana, Veticillium lecanii,* and *Isaria fumosoroseous*.

In certain embodiments, the spore is of a soil-inhabited entomopathogenic fungus (EPF) selected from the group consisting of *Metarhizium anisopliae, Metarhizium brunneum* (Mb), *Metarhizium robertsii, Metarhizium frigidum, Metarhizium riley, Metarhizium acridum, Beauveria brongniartii, Beauveria bassiana, Veticillium lecanii,* and *Isaria fumosoroseous*.

As a person of the art would appreciate, the fungus *Metarhizium anisopliae* was formerly known as *Metarhizium anisopliae* (basionym), and the fungus *Metarhizium brunneum* is a species within the complex group of reassigned *Metarhizium* isolates, previously grouped in the species "*Metarhizium anisopliae*" (Bischoff et al., 2009, Mycologia, Vol. 101, No. 4, pages 512-530). Thus, in certain embodiments, the fungi "*Metarhizium anisopliae*", "*Metarhizium anisopliae* var. *anisopliae*", and "*Metarhizium brunneum*" are interchangeable.

In certain embodiments, the spore of the fungus is a spore of Mb. In certain embodiments, the fungus is a spore of Mb strain 7 (Mb7).

In certain embodiments, the cargo composition promotes plant viability or growth.

In certain embodiments, the plant is selected from the group consisting of corn, wheat, oilseed rape, melon, tomato, alfalfa, sorghum, onion, citrus, bean, sugarcane, and coffee. In certain embodiments, the plant is corn. In certain embodiments, the plant is wheat. In certain embodiments, the plant is oilseed rape. In certain embodiments, the plant is melon. In certain embodiments, the plant is tomato. In certain embodiments, the plant is alfalfa. In certain embodiments, the plant is sorghum. In certain embodiments, the plant is onion. In certain embodiments, the plant is citrus. In certain embodiments, the plant is bean. In certain embodiments, the plant is sugarcane. In certain embodiments, the plant is coffee.

In certain embodiments, the cargo composition comprises an agent selected from the group consisting of a $CO_2$ emitting composition, a nutrient emitting composition, a pesticide emitting composition, symbiont bacteria, symbiont fungi, and any combination thereof. In certain embodiments, the cargo composition comprises $CO_2$ emitting composition. In certain embodiments, the cargo composition comprises a nutrient emitting composition. In certain embodiments, the cargo composition comprises a pesticide emitting composition. In certain embodiments, the pesticide is selected from the group consisting of essential oils, cypermethrin, azadirachtin, lambda cyalothrin, pyrethroids, spinosad, emamectin benzoate, Bifenthrin, and Neem oil. In certain embodiments, the pesticide is an essential oil. In certain embodiments, the pesticide is cypermethrin. In certain embodiments, the pesticide is azadirachtin. In certain embodiments, the pesticide is lambda cyalothrin. In certain embodiments, the pesticide is pyrethroids. In certain embodiments, the pesticide is spinosad. In certain embodiments, the pesticide is emamectin benzoate. In certain embodiments, the pesticide is Bifenthrin. In certain embodiments, the pesticide is Neem oil.

In certain embodiments, the cargo composition comprises symbiont bacteria. In certain embodiments, the cargo composition comprises symbiont fungi.

In certain embodiments, the binder composition comprises a lectin. In certain embodiments, the binder composition comprises an agglutinin protein. In certain embodiments, the binder composition binds to N-acetyl-D-glucosamine (GlcNAc) or to a sialic acid. In certain embodiments, the binder composition binds to N-acetyl-D-glucosamine (GlcNAc) and to a sialic acid. In certain embodiments, the binder composition binds to N-acetyl-D-glucosamine in the form of chitin. In certain embodiments, the binder composition comprises wheat germ agglutinin (WGA). In certain embodiments, the WGA comprises a WGA homodimer.

In certain embodiments, the complex comprises an S. carpocapsae (Sc) or a H. bacteriophora (Hb) entomopathogenic nematode (EPN), a cargo composition comprising a spore of Mb strain 7 (Mb7), and a binder composition comprising wheat germ agglutinin (WGA) that binds the cargo composition to the EPN. In certain embodiments, the complex comprises an Sc EPN, a spore of Mb7 and WGA. In certain embodiments, the complex comprises an Hb EPN, a spore of Mb7 and WGA.

The present invention further provides, in another aspect, a method for preparing a complex, wherein the complex comprises an entomopathogenic nematode (EPN), a cargo composition attached to the external surface of the EPN, and a binder composition that binds the external cargo composition to the external surface of the EPN, the method comprising the steps of incubating the EPN with the binder composition to prepare an EPN-binder complex, incubating the cargo composition with the binder composition to prepare a cargo-binder complex, and optionally incubating the EPN-binder complex with the cargo-binder complex, thereby preparing the EPN-binder-cargo complex.

In certain embodiments, the method comprises the step of incubating the EPN with the binder composition and with the cargo composition, thereby preparing the EPN-binder-cargo complex.

In certain embodiments, the method comprises the steps of incubating the EPN with the binder composition to prepare an EPN-binder complex, and incubating the cargo composition with the EPN-binder complex, thereby preparing the EPN-binder-cargo complex.

In certain embodiments, the method comprises the steps of incubating the cargo composition with the binder composition to prepare a cargo-binder complex, and incubating the EPN with the cargo-binder complex, thereby preparing the EPN-binder-cargo complex.

According to some embodiments, the incubation is performed in PBS.

In certain embodiments, the method comprises the steps of incubating the EPN with the binder composition to prepare an EPN-binder complex, incubating the cargo composition with the binder composition to prepare a cargo-binder complex, and incubating the EPN-binder complex with the cargo-binder complex, thereby preparing the EPN-binder-cargo complex.

In certain embodiments, each step of incubation is independently performed at about 10° C. to about 40° C. In certain embodiments, each step of incubation is independently performed at about 20° C. to about 30° C. In certain embodiments, each step of incubation is independently performed at room temperature. In certain embodiments, each step of incubation is independently performed at about 25° C.

In certain embodiments, each step of incubation is independently performed for at least about 1 minutes. In certain embodiments, each step of incubation is independently performed for at least about 5 minutes. In certain embodiments, each step of incubation is independently performed for at least about 10 minutes. In certain embodiments, each step of incubation is independently performed for at least about 15 minutes. In certain embodiments, each step of incubation is independently performed for at least about 20 minutes. In certain embodiments, each step of incubation is independently performed for at least about 25 minutes. In certain embodiments, each step of incubation is independently performed for at least about 30 minutes. In certain embodiments, each step of incubation is independently performed for at least about 35 minutes. In certain embodiments, each step of incubation is independently performed for at least about 40 minutes. In certain embodiments, each step of incubation is independently performed for at least about 45 minutes. In certain embodiments, each step of incubation is independently performed for at least about 50 minutes. In certain embodiments, each step of incubation is independently performed for at least about 55 minutes. In certain embodiments, each step of incubation is independently performed for at least about 1 hour. In certain embodiments, each step of incubation is independently performed for at least about 6 hours. In certain embodiments, each step of incubation is independently performed for at least about 12 hours. In certain embodiments, each step of incubation is independently performed for at least about 18 hours. In certain embodiments, each step of incubation is independently performed for at least about 1 day.

In certain embodiments, each step of incubation is independently performed for about 1 minute to about 1 day. In certain embodiments, each step of incubation is independently performed for about 10 minutes to about 18 hours. In certain embodiments, each step of incubation is independently performed for about 30 minutes to about 18 hours. In certain embodiments, each step of incubation is independently performed for about 45 minutes to about 12 hours. In certain embodiments, each step of incubation is independently performed for about 1 hour to about 12 hours. In certain embodiments, each step of incubation is independently performed for about 6 hours to about 18 hours. In certain embodiments, each step of incubation is independently performed for about 6 hours to about 12 hours.

In certain embodiments, each step of incubation is independently performed in the dark. In certain embodiments, one step of incubation is performed in the dark. In certain embodiments, two steps of incubation are performed in the dark. In certain embodiments, three steps of incubation are performed in the dark.

In certain embodiments, the EPN is in a concentration of about $10^2$/ml to about $10^4$/ml, the binder is a lectin in a concentration of about 10 μg/ml to about $10^3$ μg/ml, and the cargo is a spore of a fungus in a concentration of about $10^5$/ml to about $10^7$ ml. In certain embodiments, the EPN is in a concentration of about $3*10^2$/ml to about $3*10^3$/ml, the binder is a lectin in a concentration of about 30 μg/ml to about $3*10^2$ and the cargo is a spore of a fungus in a concentration of about $3*10^4$/ml to about $3*10^6$ ml. In certain embodiments, the EPN is in a concentration of about $10^3$/ml, the binder is a lectin in a concentration of about $10^2$ μg/ml, and the cargo is a spore of a fungus in a concentration of about $10^6$/ml.

In certain embodiments, the EPN is in a concentration of about $10^2$/ml to about $10^4$/ml, the binder is WGA in a concentration of about 10 μg/ml to about $10^3$ μg/ml, and the cargo is Mb7 spore in a concentration of about $10^5$/ml to about $10^7$ ml. In certain embodiments, the EPN is in a concentration of about $3*10^2$/ml to about $3*10^3$/ml, the binder is WGA in a concentration of about 30 μg/ml to about $3*10^2$ μg/ml, and the cargo is Mb7 spore in a concentration of about $3*10^4$/ml to about $3*10^6$ ml. In certain embodiments, the EPN is in a concentration of about $10^3$/ml, the binder is WGA in a concentration of about $10^2$ μg/ml, and the cargo is Mb7 spore in a concentration of about $10^6$/ml.

In certain embodiments, the EPN is in a concentration of about $10^3$/ml. In certain embodiments, the EPN is in a concentration of about $10^3$/ml when incubated with the binder composition. In certain embodiments, the EPN is in a concentration of about $10^3$/ml when incubated with the binder composition and with the cargo composition. In certain embodiments, the EPN is in a concentration of at least about $10^2$/ml. In certain embodiments, the EPN is in a concentration of at least about $10^2$/ml when incubated with the binder composition. In certain embodiments, the EPN is in a concentration of at least about $10^2$/ml when incubated with the binder composition and with the cargo composition. In certain embodiments, the EPN is in a concentration of up to about $10^4$/ml. In certain embodiments, the EPN is in a concentration of up to about $10^4$/ml when incubated with the binder composition. In certain embodiments, the EPN is in a concentration of up to about $10^4$/ml when incubated with the binder composition and with the cargo composition.

In certain embodiments, the binder is WGA in a concentration of 100 μg/ml. In certain embodiments, the binder is WGA in a concentration of 100 μg/ml when incubated with the EPN. In certain embodiments, the binder is WGA in a concentration of 100 μg/ml when incubated with the cargo composition. In certain embodiments, the binder is WGA in a concentration of 100 μg/ml when incubated with the EPN and with the cargo composition. In certain embodiments, the binder is WGA in a concentration of at least about 10 μg/ml. In certain embodiments, the binder is WGA in a concentration of at least about 10 μg/ml when incubated with the EPN. In certain embodiments, the binder is WGA in a concentration of at least about 10 μg/ml when incubated with the cargo composition. In certain embodiments, the binder is WGA in a concentration of at least about 10 μg/ml when incubated with the EPN and with the cargo composition. In certain embodiments, the binder is WGA in a concentration of up to about $10^3$ μg/ml. In certain embodiments, the binder is WGA in a concentration of up to about $10^3$ μg/ml when incubated with the EPN. In certain embodiments, the binder is WGA in a concentration of up to about $10^3$ μg/ml when incubated with the cargo composition. In certain embodiments, the binder is WGA in a concentration of up to about $10^3$ μg/ml when incubated with the EPN and with the cargo composition.

In certain embodiments, the cargo is Mb7 spore in a concentration of about $10^6$/ml. In certain embodiments, the cargo is Mb7 spore in a concentration of about $10^6$/ml when incubated with the binder composition. In certain embodiments, the cargo is Mb7 spore in a concentration of about $10^6$/ml when incubated with the binder composition and with the EPN. In certain embodiments, the cargo is Mb7 spore in a concentration of at least about $10^5$/ml. In certain embodiments, the cargo is Mb7 spore in a concentration of at least about $10^5$/ml when incubated with the binder composition. In certain embodiments, the cargo is Mb7 spore in a concentration of at least about $10^5$/ml when incubated with the binder composition and with the EPN. In certain embodiments, the cargo is Mb7 spore in a concentration of up to about $10^7$/ml. In certain embodiments, the cargo is Mb7 spore in a concentration of up to about $10^7$/ml when incubated with the binder composition. In certain embodiments, the cargo is Mb7 spore in a concentration of up to about $10^7$/ml when incubated with the binder composition and with the EPN.

The present disclosure further provides a complex comprising an entomopathogenic nematode (EPN), a cargo composition attached to the external surface of the EPN, and a binder composition that binds the external cargo composition to the external surface of the EPN, obtainable by the methods described above.

The present disclosure further provides, in another aspect, a composition comprising a complex comprising an entomopathogenic nematode (EPN), a cargo composition attached to the external surface of the EPN, and a binder composition that binds the external cargo composition to the external surface of the EPN.

The present disclosure further provides, in another aspect, a pesticide composition, comprising a complex comprising an entomopathogenic nematode (EPN), a cargo composition attached to the external surface of the EPN, and a binder composition that binds the external cargo composition to the external surface of the EPN, and at least one additional pesticide.

The present disclosure further provides, in another aspect, a plant-supporting composition, comprising a complex comprising an entomopathogenic nematode (EPN), a cargo composition attached to the external surface of the EPN, and a binder composition that binds the external cargo composition to the external surface of the EPN, and at least one additional plant nutrient.

In certain embodiments, any one of the compositions described above is in the form of a suspension. As a person in the field would appreciate, a composition described above formulated as suspension comprises a complex described above in a solid form and a carrier. The carrier may be a liquid, a semi-solid, or a solid.

The present disclosure further provides, in another aspect, a method of killing or sustainably inhibiting a pest, comprising the step of contacting the pest with a complex comprising an entomopathogenic nematode (EPN), a cargo composition attached to the external surface of the EPN, and a binder composition that binds the external cargo composition to the external surface of the EPN, wherein the cargo composition increases the pathogenicity of the EPN towards the pest.

The present disclosure further provides, in another aspect, a method of preventing or treating a pest infection of a plant, comprising the step of administering a complex comprising an entomopathogenic nematode (EPN), a cargo composition attached to the external surface of the EPN, and a binder composition that binds the external cargo composition to the external surface of the EPN to the plant, wherein the cargo composition increases the pathogenicity of the EPN towards the pest.

The present disclosure further provides, in another aspect, a method of promoting plant viability or growth, comprising the step of contacting the plant with a complex comprising an entomopathogenic nematode (EPN), a cargo composition attached to the external surface of the EPN, and a binder composition that binds the external cargo composition to the external surface of the EPN, wherein the cargo composition promotes plant viability or growth.

Embodiments of the disclosure herein are directed to an EPN-binder-D complex, wherein D is any appropriate deliverable entity or cargo, such as an EPF, a $CO_2$ producing capsule, a capsule or nano-capsule comprising nutrients, pesticides, or any other deliverable composition.

Embodiments of the disclosure are directed to an EPN-binder-EPF complex. EPN refers herein to Entomopathogenic Nematodes and EPF refers herein to Soil-inhabited entomopathogenic fungi. Further embodiments are directed to a method for physically linking and EPN with an EPF using a binder composition, in order to prepare an EPN-binder-EPF complex. According to some embodiments, the EPN-binder-EPF complex is used as a biological pesticide.

According to some embodiments, the EPN is selected from the taxonomical group comprising nematodes from the order Rhabditida; including the Rhabditidae, Steinernematidae and Heterorhabditidae families, such as the nematodes *S. carpocapsae* (hereinafter, "Sc"), and *H. bacteriophora* (hereinafter, "Hb"), Steinernema *feltiae, S. glazeri*, Heterorhabditis *zealandica* (Hz), and Heterorhabditis *megidis* (Hm).

According to some embodiments, the EPF is selected from the *Metarhizium* species complex. According to some embodiments, the EPF is selected from the group consisting of *Metarhizium brunneum* (hereinafter, "Mb"), *M. pingshaense, M. anisopliae, M. robertsii* and *M. anisopliae, M. majus, M. lepidiotae, M. acridum, M. globosum*, and *M. guizhouense*. According to some embodiments, the EPF is Mb.

Some embodiments are directed to a method for preparing an EPN-binder-EPF complex, wherein the method comprises incubating an EPN with a binder to prepare an EPN-binder complex; and incubating the EPN-binder complex with an EPF to prepare the EPN-binder-EPF complex.

Some embodiments are directed to a method for preparing an EPN-binder-EPF complex, wherein the method comprises incubating an EPF with a binder to prepare an EPF-binder complex; and incubating the EPF-binder complex with an EPN to prepare the EPN-binder-EPF complex.

According to some embodiments, the EPN-binder complex and/or the EPF-binder complex are washed, e.g., with water, in order to remove excess reactants before incubating with the EPF and/or the EPN, respectively.

According to some embodiments, the EPN is incubated with the binder for between about 30 minutes to 24 hours. According to some embodiments, the EPN is incubated with the binder for between about 30-60 minutes. According to some embodiments, the EPN is incubated with the binder for between about 1-2 hours. According to some embodiments, the EPN is incubated with the binder for between about 2-3 hours. According to some embodiments, the EPN is incubated with the binder for between about 3-4 hours. According to some embodiments, the EPN is incubated with the binder for between about 4-5 hours. According to some embodiments, the EPN is incubated with the binder for between about 5-6 hours. According to some embodiments, the EPN is incubated with the binder for between about 6-7 hours. According to some embodiments, the EPN is incubated with the binder for between about 7-8 hours. According to some embodiments, the EPN is incubated with the binder for between about 8-9 hours. According to some embodiments, the EPN is incubated with the binder for between about 9-10 hours. According to some embodiments, the EPN is incubated with the binder for between about 10-11 hours. According to some embodiments, the EPN is incubated with the binder for between about 11-12 hours. According to some embodiments, the EPN is incubated with the binder for between about 12-13 hours. According to some embodiments, the EPN is incubated with the binder for between about 13-14 hours. According to some embodiments, the EPN is incubated with the binder for between about 14-15 hours. According to some embodiments, the EPN is incubated with the binder for between about 15-16 hours. According to some embodiments, the EPN is incubated with the binder for between about 16-17 hours. According to some embodiments, the EPN is incubated with the binder for between about 17-18 hours. According to some embodiments, the EPN is incubated with the binder for between about 18-19 hours. According to some embodiments, the EPN is incubated with the binder for between about 19-20 hours. According to some embodiments, the EPN is incubated with the binder for between about 20-21 hours. According to some embodiments, the EPN is incubated with the binder for between about 21-22 hours. According to some embodiments, the EPN is incubated with the binder for between about 22-23 hours. According to some embodiments, the EPN is incubated with the binder for between about 23-24 hours.

According to some embodiments, the EPF is incubated with the EPN-binder complex for between 30 minutes and 24 hours. According to some embodiments, the EPF is incubated with the EPN-binder complex for between about 30-60 minutes. According to some embodiments, the EPF is incubated with the EPN-binder complex for between about 1-2 hours. According to some embodiments, the EPF is incubated with the EPN-binder complex for between about 2-3 hours. According to some embodiments, the EPF is incubated with the EPN-binder complex for between about 3-4 hours. According to some embodiments, the EPF is incubated with the EPN-binder complex for between about 4-5 hours. According to some embodiments, the EPF is incubated with the EPN-binder complex for between about 5-6 hours. According to some embodiments, the EPF is incubated with the EPN-binder complex for between about 6-7 hours. According to some embodiments, the EPF is incubated with the EPN-binder complex for between about 7-8 hours. According to some embodiments, the EPF is incubated with the EPN-binder complex for between about 8-9 hours. According to some embodiments, the EPF is incubated with the EPN-binder complex for between about 9-10 hours. According to some embodiments, the EPF is incubated with the EPN-binder complex for between about 10-11 hours. According to some embodiments, the EPF is incubated with the EPN-binder complex for between about 11-12 hours. According to some embodiments, the EPF is incubated with the EPN-binder complex for between about 12-13 hours. According to some embodiments, the EPF is incubated with the EPN-binder complex for between about 13-14 hours. According to some embodiments, the EPF is incubated with the EPN-binder complex for between about 14-15 hours. According to some embodiments, the EPF is incubated with the EPN-binder complex for between about 15-16 hours. According to some embodiments, the EPF is incubated with the EPN-binder complex for between about 16-17 hours. According to some embodiments, the EPF is incubated with the EPN-binder complex for between about 17-18 hours. According to some embodiments, the EPF is incubated with the EPN-binder complex for between about 18-19 hours. According to some embodiments, the EPF is incubated with the EPN-binder complex for between about 19-20 hours. According to some embodiments, the EPF is incubated with the EPN-binder complex for between about 20-21 hours. According to some embodiments, the EPF is incubated with the EPN-binder complex for between about 21-22 hours. According to some embodiments, the EPF is incubated with the EPN-binder complex for between about 22-23 hours. According to some embodiments, the EPF is incubated with the EPN-binder complex for between about 23-24 hours.

According to some embodiments, the EPF is incubated with the binder for between about 30 minutes to 12 hours. According to some embodiments, the EPF is incubated with the binder for between about 30-60 minutes. According to some embodiments, the EPF is incubated with the binder for between about 1-2 hours. According to some embodiments, the EPF is incubated with the binder for between about 2-3 hours. According to some embodiments, the EPF is incubated with the binder for between about 3-4 hours. According to some embodiments, the EPF is incubated with the binder for between about 4-5 hours. According to some embodiments, the EPF is incubated with the binder for between about 5-6 hours. According to some embodiments, the EPF is incubated with the binder for between about 6-7 hours. According to some embodiments, the EPF is incubated with the binder for between about 7-8 hours. According to some embodiments, the EPF is incubated with the binder for between about 8-9 hours. According to some embodiments, the EPF is incubated with the binder for between about 9-10 hours. According to some embodiments, the EPF is incubated with the binder for between about 10-11 hours. According to some embodiments, the EPF is incubated with the binder for between about 11-12 hours. According to some embodiments, the EPF is incubated with the binder for between about 12-13 hours. According to some embodiments, the EPF is incubated with the binder for between about 13-14 hours. According to some embodiments, the EPF is incubated with the binder for between about 14-15 hours. According to some embodiments, the EPF is incubated with the binder for between about 15-16 hours. According to some embodiments, the EPF is incubated with the binder for between about 16-17 hours. According to some embodiments, the EPF is incubated with the binder for between about 17-18 hours. According to some embodiments, the EPF is incubated with the binder for between about 18-19 hours. According to some embodiments, the EPF is incubated with the binder for between about 19-20 hours. According to some embodiments, the EPF is incubated with the binder for between about 20-21 hours. According to some embodiments, the EPF is incubated with the binder for between about 21-22 hours. According to some embodiments, the EPF is incubated with the binder for between about 22-23 hours. According to some embodiments, the EPF is incubated with the binder for between about 23-24 hours.

According to some embodiments, the EPN is incubated with the EPF-binder complex for between 30 minutes and 12 hours. According to some embodiments, the EPN is incubated with the EPF-binder complex for between about 30-60 minutes. According to some embodiments, the EPN is incubated with the EPF-binder complex for between about 1-2 hours. According to some embodiments, the EPN is incubated with the EPF-binder complex for between about 2-3 hours. According to some embodiments, the EPN is incubated with the EPF-binder complex for between about 3-4 hours. According to some embodiments, the EPN is incubated with the EPF-binder complex for between about 4-5 hours. According to some embodiments, the EPN is incubated with the EPF-binder complex for between about 5-6 hours. According to some embodiments, the EPN is incubated with the EPF-binder complex for between about 6-7 hours. According to some embodiments, the EPN is incubated with the EPF-binder complex for between about 7-8 hours. According to some embodiments, the EPN is incubated with the EPF-binder complex for between about 8-9 hours. According to some embodiments, the EPN is incubated with the EPF-binder complex for between about 9-10 hours. According to some embodiments, the EPN is incubated with the EPF-binder complex for between about 10-11 hours. According to some embodiments, the EPN is incubated with the EPF-binder complex for between about 11-12 hours. According to some embodiments, the EPN is incubated with the EPF-binder complex for between about 12-13 hours. According to some embodiments, the EPN is incubated with the EPF-binder complex for between about 13-14 hours. According to some embodiments, the EPN is incubated with the EPF-binder complex for between about 14-15 hours. According to some embodiments, the EPN is incubated with the EPF-binder complex for between about 15-16 hours. According to some embodiments, the EPN is incubated with the EPF-binder complex for between about 16-17 hours. According to some embodiments, the EPN is incubated with the EPF-binder complex for between about 17-18 hours. According to some embodiments, the EPN is incubated with the EPF-binder complex for between about 18-19 hours. According to some embodiments, the EPN is incubated with the EPF-binder complex for between about 19-20 hours. According to some embodiments, the EPN is incubated with the EPF-binder complex for between about 20-21 hours. According to some embodiments, the EPN is incubated with the EPF-binder complex for between about 21-22 hours. According to some embodiments, the EPN is incubated with the EPF-binder complex for between about 22-23 hours. According to some embodiments, the EPN is incubated with the EPF-binder complex for between about 23-24 hours.

According to some embodiments, about $10^3$-$10^5$ EPNs are bound with about $10^5$-$10^7$ EPFs, using a concentration of about 90-110 μg/ml of a binder.

According to some embodiments, the EPN is incubated with the binder at a temperature of between about 20-30° C. According to some embodiments, the EPN is incubated with the binder at a temperature of between about 21-29° C. According to some embodiments, the EPN is incubated with the binder at a temperature of between about 22-28° C. According to some embodiments, the EPN is incubated with the binder at a temperature of between about 23-27° C. According to some embodiments, the EPN is incubated with the binder at a temperature of between about 24-26° C. According to some embodiments, the EPN is incubated with the binder at a temperature of about 25° C.

According to some embodiments, the EPF is incubated with the EPN-binder complex at a temperature of between about 20-30° C. According to some embodiments, the EPF is incubated with the EPN-binder complex at a temperature of between about 21-29° C. According to some embodiments, the EPF is incubated with the EPN-binder complex at a temperature of between about 22-28° C. According to some embodiments, the EPF is incubated with the EPN-binder complex at a temperature of between about 23-27° C. According to some embodiments, the EPF is incubated with the EPN-binder complex at a temperature of between about 24-26° C. According to some embodiments, the EPF is incubated with the EPN-binder complex at a temperature of about 25° C.

According to some embodiments, the EPF is incubated with the binder at a temperature of between about 20-30° C. According to some embodiments, the EPF is incubated with the binder at a temperature of between about 21-29° C. According to some embodiments, the EPF is incubated with the binder at a temperature of between about 22-28° C. According to some embodiments, the EPF is incubated with the binder at a temperature of between about 23-27° C. According to some embodiments, the EPF is incubated with the binder at a temperature of between about 24-26° C. According to some embodiments, the EPF is incubated with the binder at a temperature of about 25° C.

According to some embodiments, the EPN is incubated with the EPF-binder complex at a temperature of between about 20-30° C. According to some embodiments, the EPN is incubated with the EPF-binder complex at a temperature of between about 21-29° C. According to some embodiments, the EPN is incubated with the EPF-binder complex at a temperature of between about 22-28° C. According to some embodiments, the EPN is incubated with the EPF-binder complex at a temperature of between about 23-27° C. According to some embodiments, the EPN is incubated with the EPF-binder complex at a temperature of between about 24-26° C. According to some embodiments, the EPN is incubated with the EPF-binder complex at a temperature of about 25° C.

Some embodiments of the disclosure are directed to a kit comprising an EPN a binder and a deliverable entity or cargo D, e.g., an EPF, and instructions according to which the user may prepare an EPN-binder-D complex. Some embodiments are directed to a kit comprising an EPN-binder complex, a deliverable entity or cargo D, e.g., an EPF and instructions according to which a user may prepare an EPN-binder-D complex. Some embodiments are directed to a kit comprising a binder-D complex, and EPN and instructions according to which a user may prepare an EPN-binder-D complex. Any one of the kits detailed above may include any further necessary ingredients, such as PBS and the like, which may be used to prepare the EPN-binder-D complex.

Any one of the materials in the kit, as well as the final product, i.e., the EPB-binder-D complex, may be provided as a powder. According to some embodiments, the final product EPN-binder-D complex, if in the form of a powder, may be mixed with water to provide a liquid and then, applied to the soil, where desired in liquid form, e.g., by spray.

As used herein, the term "about" is defined as ±10% of the specifically disclosed value.

In order to better understand how the present disclosure may be carried out, the following examples are provided, demonstrating a process according to the present disclosure.

EXAMPLES

Example 1

Methods and Materials

Spore preparation: A green fluorescent protein (GFP)-transformed variant of the virulent isolate *Metrhizium brunneum* (Mb) Mb7 (isolated in Israel) was constructed as described in Ment et al., Environmental Microbiology, 14: 1570-1583, 2012. To obtain the Mb7 conidia (spores), the Mb7 were cultivated on M-100 agar medium for three weeks at 28° C. The Mb7 conidia were harvested by scraping and were then suspended in sterile phosphate buffered saline (PBS) containing 0.01% v/v Triton X-100. The suspension was then filtered through Miracloth and adjusted to $1 \times 10^7$ Mb7 conidia/ml by addition of sterile PBS (pH=7.2) 0.01% (v/v) Triton X-100.

IJ Nematode preparation: The entomopathogenic nematodes (EPNs) *S. carpocapsae* (Sc) and *H. bacteriophora* (Hb) were obtained and reared on the $5^{th}$ instar of larvae of the greater wax moth, *Galleria mellonella*, according to the method provided by Kaya et al., Manual of Techniques in Insect Pathology, Academic press, San Diego, pp. 281-324, 1997. The third-stage infective juvenile (IJ) nematodes emerging from the larval cadaver of *G. mellonella* were collected, and stored until further used for microscopy analysis. Prior to binding experiments detailed below, approximately 1000 nematodes of each strain were washed twice in PBS using centrifugation 10,000 rpm for two minutes. Samples of each of the strain of nematode (Sc, Hb) were then subjected to incubation with a lectin wheat germ agglutinin (WGA)-(Alexa-fluor 555) conjugate for 45 minutes at room temperature at a final concentration of 100 μg/ml WGA.

Complex formation: At the same time, the Mb7 conidia were also incubated with WGA separately, and then, were combined with each of the EPN strains. Control samples were incubated with PBS only. Following incubation with WGA, the samples were washed with PBS twice using centrifugation of 10,000 rpm for two minutes. WGA-labeled samples were then mounted on microscope slides and viewed under a laser scanning confocal microscope. It is noted that this step was performed in order to prove the general binding of the EPN strains to the WGA and therefore, the incubation is for 45 minutes, which proved to be long enough to provide bonding. In the biological experiments detailed below, the incubation period was raised to 12 hours (overnight), in order to maximize the binding of the EPN strains to the WGA.

Bioassay

*S. carpocapsae* (Sc) infective juveniles (IJ's) (approx. 10,000) were incubated overnight, with (WGA)-(Alexafluor 555) conjugate at 25° C. at a final concentration of 100 µg/ml in PBS in order to attach the IJ's to the WGA. IJ's were then washed twice to remove excess unattached WGA, and were incubated for another night with a suspension of approximately $1 \times 10^6$ Mb7 conidia/ml. The formed IJ-WGA-Mb7 complex was then placed on a filter paper in a plastic container padded with moist paper towels. On the far edge of the container (length approx. 25 cm) baits of larvae of the greater wax moth, *Galleria mellonella*, were placed.

The following controls were prepared as well: 1: Sc IJ's incubated with Mb7, without WGA; 2: Sc Lis only, without Mb7 and without WGA; and 3: Mb7 only, without Lis and without WGA.

Additionally, to verify the infectivity of the Mb7 culture, a suspension of control was also dripped directly on larvae baits as a positive control. After incubating for 48 hours, the containers were checked for larvae mortality. Dead larvae were then incubated for another 2-3 days before dissection and confocal microscope analysis.

Results

The results show that the WGA lectin was able to bind to Mb7 spores as well as to both EPN strains. The binding of WGA lectin (red) was observed in the apex of Mb7 spores (green) (FIG. 1A). For the nematode Sc, WGA lectin (red) binding was generally to the cuticle (FIG. 1B), whereas for the nematode Hb, WGA lectin (red) binding was specifically to the anterior region (FIG. 1C).

Further, When Mb7 was incubated with WGA and either species of the nematode (Hb or Sc), adherence of the WGA to both the Mb7 spores and to the Hb or Sc EPN strains was demonstrated (see FIGS. 2A and 2B, respectively, particularly, see the arrows identifying each part of the IJ-WGA-Mb7 complex).

In addition, the bioassay results show that the Hb and Sc EPN strains can carry the attached Mb7 spores to a target insect, i.e., to a larvae bait. Particularly, the EPN strains attached to WGA and incubated with Mb7 spores showed the germination of Mb7 spores (green) on the larvae cuticle (FIG. 3C), whereas when EPNs were incubated with Mb7 spores without being attached to WGA, the Mb7 spores were not identified on the larvae (FIG. 3B, negative control). The positive control is presented in FIG. 3A, in which Mb7 spores (green) were dripped directly only to larvae, shows germination and infection of the larvae.

Conclusions: Lectins bind to the external surface of EPNs. Lectins bind to the external surface of various cargos. Lectins attach various cargos to the external surface of EPNs. EPNs carry and deliver external cargos to EPNs' natural targets.

Example 2

In order to connect between nematodes and spores, several reagents were tested. The reagents belong to different groups including lectins, antibody, amino acids, cross linkers, protenoids and polysaccharides. All experiments were carried out with approximately 1000 nematodes/ml for reaction and $10^6$ Mb7 conidia/ml.

Lectin (WGA)-(alexa-fluor-555) conjugates diluted to 1:10-final concentration of 100 ug/ml was attached to *H. bacteriophora* nematodes by mixing, thereby forming a nematode-WGA complex. Following attachment to the nematodes, the nematode-WGA complex was washed and conidia were added to the reaction vessel and incubated overnight. Approximately only a dozen conidia were attached to the nematode cuticle. To increase number of conidia attachment incubation time was increased for 24 hours of incubation, a higher conidia concentration was added of $10^8$ Mb7 conidia/ml, calcium was added at a concentration of 0.5 M to change the osmolarity of the buffer in order to promote better attachment of the conidia to the nematode-WGA complex, incubation on nematode growth medium (NGM) and in soil was examined and the results exhibit attached conidia.

Antibody

O-GlcNAc antibody Alexafluor 647, used to detect fungi and worms, was applied to nematode cuticle according to manufacturer protocol. The antibody detects 0-linked glycoproteins which are present on fungi and worms (nematodes). Conidia were not found attached to the nematode cuticle.

Amino Acid

Poly-lysine, which is a positively charged amino acid, was used at a concentration of 20 mg/ml in PBS at 25 □C. overnight and 37 □C. for one hour. Conidia were attached to the nematode cuticle, but the attachment on the surface of the nematode was not stable.

Crosslinker

The Sulthydryl-Sulfhydryl crosslinker, BM(Peg)3, was applied to nematode cuticle according to manufacturer protocol with and without EDTA. The crosslinker was applied to the nematodes at a concentration of 10 mg/ml in PBS buffer and was washed in water. Conidia in 0.1M bicarbonate solution were applied to the nematodes after 2 hours and after an overnight incubation. Conidia treatment with tris (2-carboxyethyl)phosphine (TCEP) reducing gel (as in the manufacturer's protocol) and heat treatment did not promote conidia attachment to the nematode cuticle.

An amine-amine crosslinker, 3,3'-dithiobis(sulfosuccinimidyl propionate) (DTSSP), was applied to nematode cuticle according to the manufacturer protocol with and without EDTA. Heat treatment did not promote conidia attachment.

Sulfhydryl-amine crosslinker, sulfo-smcc, was applied to nematode cuticle according to manufacturer protocol with TCEP reducing gel and also did not promote conidia attachment to the nematode cuticle.

NHS-PEG-Maleimide crosslinker was applied to nematode cuticle at a concentration of 10 mg/ml in PBS buffer and was washed in water. Conidia in 0.1M bicarbonate solution were applied to the nematodes after 2 hours and after an overnight incubation. This treatment also did not promote conidia attachment.

Polysaccharide

Chitosan at 0.1% and 1% in 1% acetic acid was applied to nematode cuticle for 3 hours at room temperature. No attachment was detected.

Proteonid

Polylisine-DOPA-Phenylalanine was added to nematode solution at a concentration of 20 mg/ml in PBS at 25° C. over night and 37° C. degrees for one hour of incubation followed by the addition of the conidia suspension, which did not promote attachment of conidia to the nematodes.

Conclusion: In contrast to lectins, antibodies (against GlcNAc), peptides (poly-lysine), cross linkers (Sulfhydryl-Sulfhydryl, amine-amine, Sulfhydryl-amine, NHS-PEG-Maleimide), polysaccharides (Chitosan), and proteonids (Poly-lysine-DOPA-Phenylalanine) have all failed to attach external cargos to EPNs.

Example 3

Various materials are attached to nematodes using the above methods, including, for example, $CO_2$ emitting capsules (e.g., as described by Humbert et al., World J. Microbiol. Biotechnol. 33, 71) microelements, bio-fertilizers, fertilizers, bio-insecticides, chemical insecticides, microbial control agents, such as symbiont viruses, symbiont bacteria and symbiont fungi.

Thus, according to this disclosure, nematodes may be used as vehicles for carrying any type of material to a target that nematodes are naturally attracted to, thereby providing that target with any desired or required material.

While certain features of the disclosure have been illustrated and described herein, many modifications, substitutions, changes, and equivalents may occur to those skilled in the art. It is, therefore, to be understood that the appended claims are intended to cover all such modifications and changes as fall within the true spirit of the disclosure.

The invention claimed is:

1. A complex, comprising:
   (a) an entomopathogenic nematode (EPN),
   (b) a cargo composition attached to the external surface of the EPN, and
   (c) a binder composition that binds the external cargo composition to the external surface of the EPN
wherein the cargo composition comprises a spore of a fungus, and wherein the binder composition comprises a lectin.

2. The complex of claim 1, wherein the EPN is selected from the group consisting of Steinernema *carpocapsae* (Sc), Heterorhabditis *bacteriophora* (Hb), Heterorhabditis *indica* (Hi), Steinernema *feltiae* (Sf), Steinernema *kraussei* (Sk), Steinernema *glaseri* (Sg), Phasmarhabditis *hermaphrodita* (Ph), Phasmarhabditis *neopapillosa* (Pn), Phasmarhabditis *californica* (Pc), Heterorhabditis *zealandica* (Hz), and Heterorhabditis megidis (Hm).

3. The complex of claim 1, wherein the EPN is in third-stage, infective juvenile (IJ) phase.

4. The complex of claim 1, wherein the cargo composition increases the pathogenicity of the EPN towards a pest.

5. The complex of claim 4, wherein the pest is selected from the group consisting of a Lepidoptera, a Coleoptera, a Hemiptera, a Diptera, an Orthoptera, an Acari, and a Gastropoda.

6. The complex of claim 1, wherein the cargo composition promotes plant viability or growth.

7. The complex of claim 1, wherein the binder composition comprises an agglutinin protein.

8. The complex of claim 1, wherein the binder composition binds to N-acetyl-D-glucosamine (GlcNAc) or to a sialic acid.

9. The complex of claim 8, wherein the binder composition binds to N-acetyl-D-glucosamine (GlcNAc) and to a sialic acid.

10. The complex of claim 8, wherein the binder composition binds to N-acetyl-D-glucosamine in the form of chitin.

11. The complex claim 1, wherein the binder composition comprises wheat germ agglutinin (WGA).

12. The complex of claim 1, wherein the complex, comprises:
   (a) an *S. carpocapsae* (Sc) or a *H. bacteriophora* (Hb) entomopathogenic nematode (EPN),
   (b) a cargo composition comprising a spore of *Metarhizium brunneum* strain 7 (Mb7), and
   (c) a binder composition comprising wheat germ agglutinin (WGA) that binds the cargo composition to the EPN.

13. The complex of claim 1, wherein the spore of the fungus is selected from the group consisting of a spore of *Metarhizium anisopliae*, *Metarhizium brunneum*, *Metarhizium robertsii*, *Metarhizium frigidum*, *Metarhizium rileyi*, *Metarhizium acridum*, *Beauveria brongniartii*, *Beauveria bassiana*, *Verticillium lecanii*, and *Isaria fumosorosea*.

14. A method for preparing a complex, wherein the complex comprises an entomopathogenic nematode (EPN), a cargo composition attached to the external surface of the EPN, and a binder composition that binds the external cargo composition to the external surface of the EPN, the method comprising the steps of
   (a) incubating the EPN with the binder composition to prepare an EPN-binder complex,
   (b) incubating the cargo composition with the binder composition to prepare a cargo-binder complex, and
   (c) incubating the EPN-binder complex with the cargo-binder complex, thereby preparing the EPN-binder-cargo complex,
wherein the cargo composition comprises a spore of a fungus, and wherein the binder composition comprises a lectin.

15. The method of claim 14, comprising the step of incubating the EPN with the binder composition and with the cargo composition, thereby preparing the EPN-binder-cargo complex.

16. The method of claim 14, comprising the steps of
   (a) incubating the EPN with the binder composition to prepare an EPN-binder complex, and
   (b) incubating the cargo composition with the EPN-binder complex,
thereby preparing the EPN-binder-cargo complex.

17. The method of claim 14, comprising the steps of
   (a) incubating the cargo composition with the binder composition to prepare a cargo-binder complex, and
   (b) incubating the EPN with the cargo-binder complex,
thereby preparing the EPN-binder-cargo complex.

18. The method of claim 14, comprising the steps of
   (a) incubating the EPN with the binder composition to prepare an EPN-binder complex,
   (b) incubating the cargo composition with the binder composition to prepare a cargo-binder complex, and
   (c) incubating the EPN-binder complex with the cargo-binder complex, thereby preparing the EPN-binder-cargo complex.

19. A method of killing or sustainably inhibiting a pest, comprising the step of contacting the pest with a complex comprising an entomopathogenic nematode (EPN), a cargo composition attached to the external surface of the EPN, and a binder composition that binds the external cargo composition to the external surface of the EPN, wherein the cargo composition increases the pathogenicity of the EPN towards the pest, wherein the cargo composition comprises a spore of a fungus, and wherein the binder composition comprises a lectin.

* * * * *